US009107030B2

(12) United States Patent
Coverstone

(10) Patent No.: US 9,107,030 B2
(45) Date of Patent: Aug. 11, 2015

(54) COMMUNICATION SYSTEM FOR SENDING ADVERTISEMENTS BASED ON LOCATION DETERMINATION AND PREVIOUSLY SPECIFIED USER SELECTIONS

(76) Inventor: Thomas E. Coverstone, Hallsville, CA (US)

( * ) Notice: Subject to any disclaimer, the term of this patent is extended or adjusted under 35 U.S.C. 154(b) by 0 days.

(21) Appl. No.: 10/020,094

(22) Filed: Dec. 13, 2001

(65) Prior Publication Data
US 2002/0193122 A1 Dec. 19, 2002

Related U.S. Application Data

(60) Provisional application No. 60/255,331, filed on Dec. 13, 2000.

(51) Int. Cl.
*H04W 24/00* (2009.01)
*H04W 4/02* (2009.01)
*H04W 4/00* (2009.01)
*H04W 8/18* (2009.01)

(52) U.S. Cl.
CPC . *H04W 4/02* (2013.01); *H04W 4/00* (2013.01); *H04W 4/021* (2013.01); *H04W 8/18* (2013.01)

(58) Field of Classification Search
CPC ....... H04W 12/12; H04W 64/00; H04W 4/02; H04W 4/14; H04L 20/08108; H04L 2012/5607; H04L 29/08072; G06Q 30/0207
USPC ........ 455/456.1–456.6, 410, 414.1, 456–457, 455/466, 41.2, 41.3, 404.2; 342/357.07; 370/310.2, 312, 328, 338; 709/217; 705/14

See application file for complete search history.

(56) References Cited

U.S. PATENT DOCUMENTS

| 3,673,318 | A | 6/1972 | Olsen et al. |
| 3,859,457 | A | 1/1975 | Kirk, Jr. |
| 3,919,462 | A | 11/1975 | Hartung et al. |
| 3,919,479 | A | 11/1975 | Moon et al. |

(Continued)

FOREIGN PATENT DOCUMENTS

| AU | 536261 | 5/1982 |
| AU | 80145-82 | 10/1982 |

(Continued)

OTHER PUBLICATIONS

Bernhard Koelmel, ELBA-03-1.1-ELBA, Oct. 16, 2003, 17 pages, 3G European Location Based Advertising, Information Society Technologies Programme, Brussels, Belgium.

(Continued)

*Primary Examiner* — Steve D Agosta
(74) *Attorney, Agent, or Firm* — McAndrews, Held & Malloy, Ltd.

(57) ABSTRACT

Disclosed is a wireless communication system that is used with a wireless communication device and a position location system, the wireless communication device being capable of communicating with the position location system. The wireless communication system includes a memory device for storing position locations of the wireless communication device and for storing transactions made relating to the wireless communication device, a processor for determining trends by recalling stored information from the memory device and processing the recalled information, and a transmitter for transmitting targeted broadcasts to the wireless communication device based on the current location of the communication device.

19 Claims, 6 Drawing Sheets

(56) References Cited

U.S. PATENT DOCUMENTS

| | | |
|---|---|---|
| 4,068,264 A | 1/1978 | Pires |
| 4,114,139 A | 9/1978 | Boyd et al. |
| 4,215,366 A | 7/1980 | Davidson |
| 4,225,884 A | 9/1980 | Block et al. |
| 4,229,765 A | 10/1980 | Sanger |
| 4,245,245 A | 1/1981 | Matsumoto |
| 4,266,098 A | 5/1981 | Novak |
| 4,280,139 A | 7/1981 | Mogi |
| 4,325,078 A | 4/1982 | Seaton |
| 4,331,974 A | 5/1982 | Cogswell |
| 4,333,110 A | 6/1982 | Faerber et al. |
| 4,338,628 A | 7/1982 | Payne et al. |
| 4,348,696 A | 9/1982 | Beier |
| 4,354,201 A | 10/1982 | Sechet et al. |
| 4,375,651 A | 3/1983 | Templin et al. |
| 4,386,436 A | 5/1983 | Kocher et al. |
| 4,398,193 A | 8/1983 | Kuniyoshi et al. |
| 4,425,579 A | 1/1984 | Merrell |
| 4,484,217 A | 11/1984 | Block et al. |
| 4,488,179 A | 12/1984 | Kruger et al. |
| 4,510,623 A | 4/1985 | Bonneau et al. |
| 4,520,404 A | 5/1985 | Von Kohorn |
| 4,528,588 A | 7/1985 | Lofberg |
| 4,528,589 A | 7/1985 | Block et al. |
| 4,530,008 A | 7/1985 | McVoy |
| 4,536,791 A | 8/1985 | Campbell et al. |
| 4,554,584 A | 11/1985 | Elam et al. |
| 4,588,857 A | 5/1986 | Arsem |
| 4,591,664 A | 5/1986 | Freeman |
| 4,595,950 A | 6/1986 | Lofberg |
| 4,598,288 A | 7/1986 | Yarbrough et al. |
| 4,600,921 A | 7/1986 | Thomas |
| 4,602,297 A | 7/1986 | Reese |
| 4,605,964 A | 8/1986 | Chard |
| 4,605,973 A | 8/1986 | Von Kohorn |
| 4,620,229 A | 10/1986 | Amano et al. |
| 4,633,297 A | 12/1986 | Skerlos et al. |
| 4,670,857 A | 6/1987 | Rackman |
| 4,685,131 A | 8/1987 | Horne |
| 4,695,904 A | 9/1987 | Shinyagaito et al. |
| 4,696,034 A | 9/1987 | Wiedemer |
| 4,718,107 A | 1/1988 | Hayes |
| 4,729,044 A | 3/1988 | Kiesel |
| 4,750,213 A | 6/1988 | Novak |
| 4,768,229 A | 8/1988 | Benjamin et al. |
| 4,787,063 A | 11/1988 | Muguet |
| 4,814,883 A | 3/1989 | Perine et al. |
| 4,837,623 A | 6/1989 | Motoyama |
| 4,888,796 A | 12/1989 | Olivo, Jr. |
| 4,896,354 A | 1/1990 | Inagaki et al. |
| 4,930,158 A | 5/1990 | Vogel |
| 4,930,160 A | 5/1990 | Vogel |
| 4,939,596 A | 7/1990 | Takayama et al. |
| 5,408,683 A * | 4/1995 | Ablay et al. ............... 455/433 |
| 5,461,390 A | 10/1995 | Hoshen |
| 5,530,232 A * | 6/1996 | Taylor ........................ 235/380 |
| 5,572,221 A * | 11/1996 | Marlevi et al. ............. 342/452 |
| 5,742,915 A | 4/1998 | Stafford |
| 5,749,052 A | 5/1998 | Hidem et al. |
| 5,774,802 A | 6/1998 | Tell et al. |
| 5,809,415 A | 9/1998 | Rossmann |
| 5,835,722 A | 11/1998 | Bradshaw et al. |
| 5,852,775 A * | 12/1998 | Hidary ....................... 455/412.1 |
| 5,938,721 A * | 8/1999 | Dussell et al. .............. 701/211 |
| 5,948,041 A * | 9/1999 | Abo et al. ................... 701/207 |
| 5,959,577 A * | 9/1999 | Fan et al. ................ 342/357.13 |
| 5,999,126 A * | 12/1999 | Ito .............................. 342/357.1 |
| 5,999,912 A * | 12/1999 | Wodarz et al. .............. 705/14 |
| 6,026,369 A * | 2/2000 | Capek ......................... 705/14 |
| 6,026,375 A | 2/2000 | Hall et al. |
| 6,047,327 A | 4/2000 | Tso et al. |
| 6,070,147 A | 5/2000 | Harms et al. |
| 6,073,005 A | 6/2000 | Raith et al. |
| 6,098,048 A | 8/2000 | Dashefsky et al. |
| 6,101,483 A | 8/2000 | Petrovich et al. |
| 6,115,596 A | 9/2000 | Raith et al. |
| 6,123,259 A | 9/2000 | Ogasawara |
| 6,137,878 A | 10/2000 | Vonder Haar et al. |
| 6,172,640 B1 * | 1/2001 | Durst et al. .............. 342/357.07 |
| 6,177,905 B1 * | 1/2001 | Welch ..................... 342/357.13 |
| 6,208,866 B1 * | 3/2001 | Rouhollahzadeh et al. ........................ 455/456.5 |
| 6,266,612 B1 | 7/2001 | Dussell et al. |
| 6,324,269 B1 | 11/2001 | Malik |
| 6,327,570 B1 | 12/2001 | Stevens |
| 6,330,543 B1 | 12/2001 | Kepecs |
| 6,389,337 B1 | 5/2002 | Kolls |
| 6,418,462 B1 | 7/2002 | Xu |
| 6,472,976 B1 * | 10/2002 | Wohl ........................ 340/10.41 |
| 6,505,046 B1 * | 1/2003 | Baker ....................... 455/456.3 |
| 6,539,430 B1 | 3/2003 | Humes |
| 6,564,327 B1 | 5/2003 | Klensin et al. |
| 6,571,279 B1 | 5/2003 | Herz et al. |
| 6,611,687 B1 | 8/2003 | Clark et al. |
| 6,618,593 B1 | 9/2003 | Drutman et al. |
| 6,647,257 B2 * | 11/2003 | Owensby .................. 455/414.1 |
| 6,654,800 B1 | 11/2003 | Rieger, III |
| 6,677,894 B2 * | 1/2004 | Sheynblat et al. ......... 342/357.1 |
| 6,684,240 B1 | 1/2004 | Goddard |
| 6,731,940 B1 | 5/2004 | Nagendran |
| 6,819,919 B1 | 11/2004 | Tanaka |
| 6,831,896 B1 * | 12/2004 | Lempio et al. ............... 370/252 |
| 6,912,398 B1 * | 6/2005 | Domnitz ....................... 455/461 |
| 7,106,843 B1 | 9/2006 | Gainsboro et al. |
| 7,136,915 B2 | 11/2006 | Rieger, III |
| 7,668,832 B2 | 2/2010 | Yeh et al. |
| 7,680,796 B2 | 3/2010 | Yeh et al. |
| 2002/0022488 A1 * | 2/2002 | Srinivasan et al. ............ 455/456 |
| 2002/0077130 A1 * | 6/2002 | Owensby ..................... 455/466 |
| 2008/0059300 A1 | 3/2008 | Hamoui |
| 2009/0199107 A1 | 8/2009 | Lewis et al. |
| 2010/0036710 A1 | 2/2010 | Ames |
| 2010/0049585 A1 | 2/2010 | Mcintyre et al. |
| 2010/0070758 A1 | 3/2010 | Low et al. |
| 2010/0082397 A1 | 4/2010 | Blegen |

FOREIGN PATENT DOCUMENTS

| | | |
|---|---|---|
| AU | 5675786 | 11/1986 |
| EP | 0112575 A1 | 7/1984 |
| EP | 0112575 B1 | 3/1986 |
| EP | 0053885 A2 | 7/1986 |
| GB | 1424739 | 2/1976 |
| GB | 2062401 A | 5/1981 |
| GB | 8138341 | 7/1986 |
| GB | 2206759 A | 1/1989 |
| GB | 2206759 B | 1/1992 |
| JP | 59-210782 | 11/1984 |

OTHER PUBLICATIONS

Porak, Anatol, Overview English, ELBA, 2004, 17 pages, Information Society Technologies Programme, Brussels, Belgium.

Dimpfel et al., Integration & Content, ELPA, 2004, 22 pages, Information Society Technologies Programme, Brussels, Belgium.

Aalto et al., Bluetooth and WAP Push Based Location-Aware Mobile Advertising System, MobiSYS' 04, Jun. 6, 2004, 10 pages, 2004 Conference, Association for Computing Machinery, New York, NY, USA.

Steiniger et al., Foundations of Location Based Services, 2006, 28 pages, University of Zurich, Zurich, Switzerland.

Bruner and Kumar, Attitude toward Location-Based Advertising, Journal of Interactive Advertising, vol. 7, No. 2, Spring 2007, 15 pages, American Academy of Advertising, aaasite.org, Beachwood, OH.

Murphy, David, In Search of Spot Relevance, Mobile Marketing Magazine, Jul. 13, 2007, 2 pages, United Kingdom.

NAVTEQ bought by Nokia for 5.7 billion, accessed on yourNAV.com, Oct. 12, 2007, 3 pages.

Catone, Josh, Companies Betting on Location Based Mobile Ads, Feb. 6, 2008, 2 pages, ReadWriteWeb.com.

O'Sullivan, Cian, NAVTEQ unveils location-based mobile advertising service, Jan. 12, 2009, 2 pages, GoMoNews.com.

(56) References Cited

OTHER PUBLICATIONS

NOKIA, Nokia Q4 2008 Financial Highlights, Press Release, Jan. 22, 2009, 17 pages, presse.nokia.at, Nokia, Germany.
Microsoft Advertising Announces Eight New Mobile Partners, Press Release, Barcelona, Spain, Feb. 16, 2009, 2 pages, Microsoft Corporation, Redmond, Washington.
Xiam Technologies Advances Technologies to put Recommendations on the Map, Feb. 20, 2009, 3 pages, Qualcomm Inc., Dublin, Ireland.
T-Mobile, T-Mobile uses innovative Bluetooth technology to drive footfall, Press Release, Mar. 24, 2009, 2 pages, mobiadnews.com, T-Mobile, London, UK.
T-Mobile, T-Mobile to Trial Proximity Marketing in UK Stores, Press Release, Mar. 29, 2009, 2 pages, mobiadnes.com, T-Mobile, London, UK.
Harnick, Chris, Navteq to serve location-based ads in Nextar GPS system, Aug. 31, 2009, 2 pages, mobilemarketer.com/cms/news/search/4047.print, Mobile Marketer, New York, NY, USA.
Gannes, Liz, Mobilize: The Dawn of Location-Aware Mobile Ads, Sep. 10, 2009, 4 pages, GigaOM. San Francisco, CA.
NAVTEQ Acquires Acuity Mobile, Web page downloaded Sep. 14, 2009, 2 pages, Acuity Mobile, Washington, DC.
Navteq Acquires Acuity Mobile, Acquisition Expands Existing Location Based Advertising Capabilities, Press Release, Sep. 14, 2009, 2 pages, Acquity Mobile, Chicago, IL.
Ricketts, Camille, Nokia's NAVTEQ buys Acuity Mobile for location-based advertising, Sep. 15, 2009, 4 pages, VentureBeat, San Francisco, CA.
Ricketts, Camille, Nokia's NAVTEQ buys Acuity Mobile for location-based advertising, Sep. 15, 2009, 4 pages, accessed on digital.venturebeat.com/2009/09/15, DigitalBeat, San Francisco, CA, USA.
Google, Google to Acquire AdMob, Press Release, Nov. 2, 2009, 2 pages, accessed on google.com/press/pressrel/20091109_admob, Google, Mountain View, CA.
Acuity Mobile Company Overview, accessed on accuitymobile.com, Nov. 4, 2009, 2 pages, Acuity Mobile, Washington, DC.
Acuity Mobile eMAP Mobile Advertising Platform, accessed on accuitymobile.com, Nov. 4, 2009, 2 pages, Acuity Mobile, Washington, DC.
Acuity Mobile eMAP Key Benefits, accessed on accuitymobile.com, Nov. 4, 2009, 2 pages, Acuity Mobile, Washington, DC.
Acuity Mobile AisleCaster, accessed on accuitymobile.com, Nov. 4, 2009, 2 pages, Acuity Mobile, Washington, DC.
Acuity Mobile Spot Relevance, accessed on accuitymobile.com, Nov. 4, 2009, 2 pages, Acuity Mobile, Washington, DC.
Acuity Mobile, Inc., Company Overview, BusinessWeek, Nov. 4, 2009, 3 pages, Bloomberg L.P., New York, NY.
Wikipedia: Location based advertising, accessed on Wikipedia.org, Nov. 4, 2009, 4 pages, Wikimedia Foundation, San Francisco, CA.
Google to Acquire AdMob, Press Release, Nov. 9, 2009, 2 pages, Google, Mountain View, CA.
Hof, Richard, Why Google is buying AdMob, BusinessWeek, Nov. 9, 2009, 2 pages, Bloomberg L.P., New York, NY.
Ferraro, Ric, Google Acquires Admob, what say you, Mobile?, Nov. 9, 2009, 2 pages, accessed on moverge.blogspot.com.
Schonfield, Erick, Admob is "Approaching a $100 Million" Run Gate, Google Thinks it can be Billions, Nov. 9, 2009, 2 pages, Techcrunch.com, San Francisco, CA.
RIM Announces New Services Platform for Blackberry Developers, Press Release, Nov. 9, 2009, 3 pages, Research in Motion.
Arghire, Ionut, RIM Brings New Services to BlackBerry App World, Softpedia, Nov. 10, 2009, 2 pages, Softpedia, Bucuresti, Romania.
Horowitz, Etan, Disney Verizon app will allow users to check wait times, plan for events, Nov. 10, 2009, 11 pages, accessed on thedailydisney.com/blog/2009/11/disney-mobile-verizon-app-will-allow-users-to-check-wait-times-plan-for-events, Disney, Orlando, FL, USA.
Smith, Thomas, Mobile Magic—First Disney Parks Mobile App Now Available, Nov. 11, 2009, 13 pages, accessed on disneyparks.disney.go.com/blog/2009/11/11, Disney Blog, Orlando, FL, USA.

Azure Mayan, Intera Bluetooth Proximity Marketing and In-Store Analytics Services, Press Release, 2009, 2 pages, Intera Communications Corporation, Pleasanton, CA.
Kane, Yukari Iwatani, Apple's Quattro Deal Pressures Google, The Wall Street Journal, Jan. 6, 2010, 2 pages, accessed on WSJ.com, New York, NY, USA.
Laughlin, Stephen, "Apple acquires Ad Firm Quattro for $275 Million," Jan. 6, 2010, accessed on stephenlaughlin.posterous.com.
The Official Ticket Center, Mobile Magic from Walt Disney World, accessed on blog.officialticketcenter.com, Jan. 15, 2010, 6 pages, The Official Ticket Center, Orlando, FL, USA.
Reardon, Marguerite, Nokia takes on Google with free navigation app, Signal Strength, Jan. 21, 2010, 4 pages, CNET News, San Francisco, CA, USA.
Jones et al., Nokia's 'Free' Navigation Creates Contextual Opportunities, Gartner Research Publication G00174023, Jan. 22, 2010, Gartner Inc., Stamford, CT.
Harnick, Chris, "Opera acquires AdMarvel to ramp up mobile advertising," Mobile Marketer, Jan. 22, 2010, 2 pages, accessed on mobilemarketer.com, Mobile Marketer, New Your, NY.
Ankeny, Jason, Verizon Wireless introduces VZ Navigator 5.0, Fierce Mobile Content, Feb. 1, 2010, 3 pages, accessed on FierceMobileContent.com.
iPhone Developer Program, App Store Tip: Enhance Your App with Core Location, accessed on Developer.Apple.com, Feb. 3, 2010, 2 pages, Apple, Cupertino, CA, USA.
Quattro Wireless, Home web page, accessed on quatrowireless.com. downloaded Feb. 9, 2010, one page, Quattro Wireless, Waltham, MA.
Quattro Wireless, Targeting Ad Serving, web page, downloaded Feb. 9, 2010, one page, Quattro Wireless, Waltham, MA.
Clark et al., Apple Note Signals Move to Claim Context-Aware Advertising, Gartner Research Publication G00174454, Feb. 10, 2010, Gartner Inc., Stamford, CT.
Genasys to leverage GyPSii OpenExperienceO API for killer mobile social app, Feb. 12, 2010, 3 pages, Genasys, Amsterdam, The Netherlands, lbszone.com, Spatial Media, LLC, Washington D.C.
NAVTEQ, LocationPoint Advertising Selected by Nobex Technologies Hyper-targeted, location aware advertising inventory available on Nobex Radio Companion, Press Center, Feb. 15, 2010, corporate.navteq.com/webapps.
Butcher, Dan, Apple blocks location-based in-app advertising, Feb. 18, 2010, 4 pages, mobilemarketer.com/cms/news/advertising/5430.print, Mobile Marketer, New York, NY, USA.
Taylor, Marisa, In-Car Navigation on the IPhone, Wall Street Journal, Feb. 20, 2010, 2 pages, WSJ.com, New York, NY, USA.
What we do—Communith & Entertainment, web page, download Feb. 23, 2010, one page, genasys.com, Genasys, Madrid, Spain.
What we do—Proximity Info. and Advertising, web page, download Feb. 23, 2010, one page, genasys.com, Madrid, Spain.
Facts about Google's acquisition of Admob, web page, download Feb. 23, 2010, one page, google.com, Google, Mountain View, CA.
Facts about Google's acquisition of Admob, Frequently Asked Questions, web page, download Feb. 23, 2010, two pages, google.com, Google, Mountain View, CA.
Alvarez, Mark, The Most Popular Location-Based App isn't Foursquare, it's MyTown, L'Atelier, Feb. 25, 2010, 3 pages, San Francisco, CA, USA.
Siegler MG, Apple Gets Location Fever Too in the App Store, TechCrunch, Mar. 17, 2010, techcrunch.com/2010/03/17, California, USA.
TechCrunch, Adverse to Adverts? Mobclix's SDK Brings Targeted Advertisements to the iPad, web page, download, Mar. 18, 2010, 4 pages, ismashphone.com/2010/03/18, California, USA.
Ankeny, Jason, Google: One in three mobile searches has local intent, web page, download, Mar. 22, 2010, one page, FierceWireless.com.
Roa, Leena, NileGuide Unveils New Location-Based iPhone App for Travel Recommendations On The Go, TechCrunch, Mar. 23, 2010, techcrunch.com/2010/03/23, California, USA.

(56) References Cited

OTHER PUBLICATIONS

Mandese, Joe, Apple Poised to Unveil 'iAD,' New Mobile Ad Platform Is Jobs' 'Next Big Thing', MediaPost News, Mar. 26, 2010, mediapost.com/publications, New York, NY, USA.

Spence, Nick, Rumour: Apple 'iAd' mobile ad platform coming soon?, MacWorld.co.uk, Mar. 29, 2010, macworld.co.uk/mac/news, London, UK.

Justin, Bluetooth Proximity Marketing Does Work, Here's Three Successful Case Studies, web page download, Apr. 6, 2010, 4 pages, www.mobilemarketingwatch.com.

Kincaid, Jason, Apple Announces iAd Mobile Advertising Platform, TechCrunch, Apr. 8, 2010, techcrunch.com/2010/04/08, California, USA.

Apple, Inc., Apple Previews iPhone OS 4, Press Release, Apr. 8, 2010, 5 pages, Apple, Inc.

Acuity Mobile eMAP, web page downloaded Apr. 13, 2010, 2 pages, Acuity Mobile, Washington, DC.

Acuity Mobile 5 Dimensions of Spot Relevance, web page downloaded Apr. 13, 2010, 2 pages, Acuity Mobile, Washington, DC.

NAVTEQ, Media Solutions, Apr. 7, 2010, accessed on navteqmedia.com/pressroom/video.

NAVTEQ, Media Solutions, Apr. 7, 2010, accessed on navteqmedia.com/pressroom/video (transcript).

Rae Atkey, "How You Can Censor Your Child's TV Viewing," The News Editorial (Adelaide), Aug. 25, 1986, Adelaide, Australia.

* cited by examiner

COMMUNICATION SYSTEM FOR SENDING ADVERTISEMENTS BASED ON LOCATION DETERMINATION AND PREVIOUSLY SPECIFIED USER SELECTIONS

RELATED APPLICATIONS

This patent application claims the benefit of U.S. Provisional Patent Application Ser. No. 60/255,331 filed on Dec. 13, 2000, and entitled System and Method for Wireless Telecommunications Network, which is incorporated by reference herein in its entirety as though set out in full.

BACKGROUND OF THE INVENTION

1. Field of the Invention

The present invention relates to wireless telecommunications network. More particularly, the present invention relates to a wireless telecommunications network wherein information relating to a communication device is stored and processed.

2. Brief Description of the Related Art

Typical wireless networks allow for two way telecommunications between multiple users utilizing communication devices, such as handsets or PDAs communicating with at least one base station. Advances in wireless telecommunications will soon provide a user location feature by locating a wireless communication device, for example, during an emergency. Such a feature typically utilizes a Global Positioning Satellite (GPS) system which has the capability of tracking the movements of each specific wireless communication device, such as a cellular telephone handset or PDA and its user. As GPS technology improves, the specific location of the cellular telephone handset and its user will be accurate within a few feet, or even less.

SUMMARY OF THE INVENTION

A first aspect of the invention is related to a telecommunications network that includes a communication device, a tracking system for tracking the communication device, and a processing device that processes information received directly or indirectly from the tracking system.

Another aspect of the invention is related to a wireless telecommunications system that includes a wireless communication device being capable of communicating with an existing position location system, and a system for storing and processing location positions of the wireless communication device. In another embodiment of this aspect of the invention, the system for storing location positions includes at least one database. In yet another embodiment of this aspect of the invention, the system stores and processes additional information relating to the wireless communication device, such as transactions made with or relating to the wireless the communication device.

Yet another aspect of the invention is related to a wireless telecommunications system includes a wireless communication device including a location position feature, the wireless communication device is capable of communicating with an existing position location system, and a system for storing and processing location positions of the wireless communication device.

Another aspect of the invention is related to a wireless telecommunications system that includes a wireless communication device being capable of communicating with an existing position location system, a memory device for storing position locations of the wireless communication device, and a processor for processing information from the memory device.

Yet another aspect of the invention is related to a wireless telecommunications system capable of communicating with an existing wireless communication device that is capable of communicating with an existing position location system. The system includes a memory device for storing location positions of the wireless communication device, and a processing system for processing information from the memory device and relating to the stored location positions of the wireless communication device.

Another aspect of the invention relates to a system that is used with an existing wireless communication device that is capable of communicating with an existing position location system, the system includes a memory device for storing position locations of the wireless communication device and a processor for processing information from the memory device.

Yet another aspect of the invention relates to a system that is used with at least one wireless communication device that is capable of communicating with a position location system, the system includes a memory device for storing position locations of the wireless communication device and a processor for determining trends from the position locations stored in the memory device.

Another aspect of the invention relates to a system that is used with a wireless communication device that is capable of communicating with a position location system, the system includes a memory device for storing transactions made relating to the wireless communication device and a processor for determining trends from the transactions stored in the memory device.

Yet another aspect of the invention relates to a system that is used with a wireless communication device and a position location system, the wireless communication device being capable of communicating with the position location system. The system includes a memory device for storing position locations of the wireless communication device and for storing transactions made relating to the wireless communication device and a processor for determining trends by recalling stored information from the memory device and processing the recalled information.

Another aspect of the invention relates to a wireless communication system that is used with a wireless communication device and a position location system, the wireless communication device being capable of communicating with the position location system. The wireless communication system includes a memory device for storing position locations of the wireless communication device and for storing transactions made relating to the wireless communication device, a processor for determining trends by recalling stored information from the memory device and processing the recalled information, and a transmitter for transmitting targeted broadcasts to the wireless communication device based on the current location of the communication device.

Still yet another aspect of the invention relates to a wireless communication system that is used with a wireless communication device and a position location system, the wireless communication device being capable of communicating with the position location system. The wireless communication system includes a memory device for storing position locations of the wireless communication device and for storing transactions made relating to the wireless communication device, a processor for determining trends by recalling stored information from the memory device and processing the recalled information, and a transmitter for transmitting targeted broadcasts to the wireless communication device based on the trends of the communication device.

BRIEF DESCRIPTION OF THE DRAWINGS

The invention will now be described in greater detail with reference to the preferred embodiments illustrated in the accompanying drawings, in which like elements bear like reference numerals, and wherein.

DETAILED DESCRIPTION AND PREFERRED EMBODIMENTS

Figure 1:
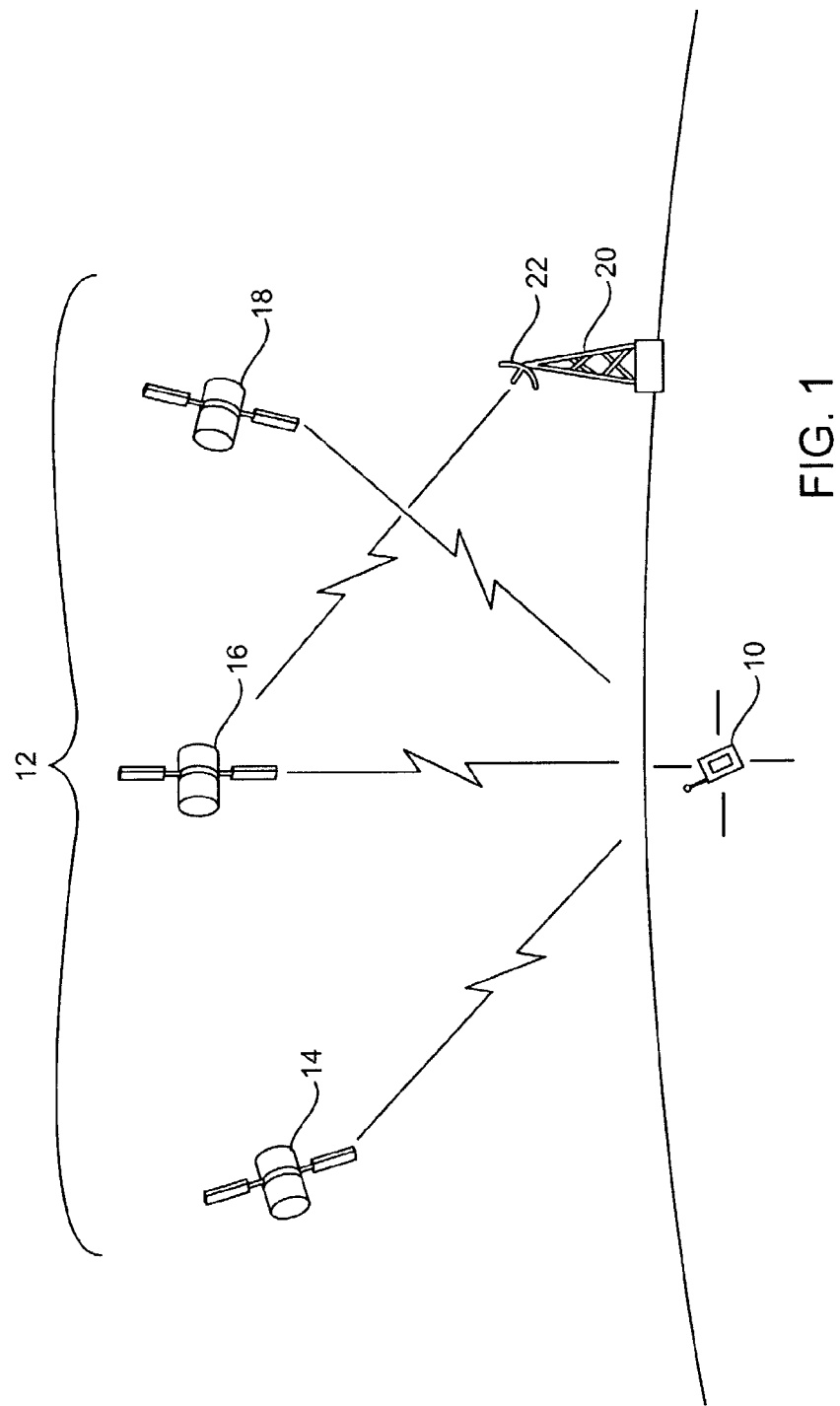
FIG. 1 illustrates a schematic representation illustrating an exemplary wireless telecommunications network according to the present invention.

FIG. 1 illustrates an exemplary GPS system with a wireless device, such as a cellular wireless handset or PDA device 10 in communication with a GPS system 12, wherein the system 12 typically includes a plurality of satellites 14, 16 and 18, and a ground station 20 with a transmitter and receiver 22. The satellites communicate with the handset 10 and with each other to determine the location of the device 10 and the user. The terms communication device and user may be used interchangeably herein. It will be understood by those skilled in the art that any type of GPS system would work with the present invention. In addition, the GPS system 12 has the capability to identify the communication device 10 by various methods, such as coding the communications from a particular handset to the GPS system.

The GPS system 12 locates and identifies a particular user. The GPS ground station may include a computer system, or the computer system may be independent of the ground station. For example, the computer system may be housed in a separate satellite, a separate ground based system, or may be embedded in at least one of the satellites, as long as the computer system is in communication with the GPS system via a communication interface.

The components in the telecommunication system may interface utilizing a cellular based system, digital cellular system, GSM (Global System for Mobile communications), PCS (Personal Communication Services), PDC (Personal Digital Cellular), radio communications, satellite communications, or other related systems. Also, the Wireless Application Protocol (WAP) may utilized as well as the Bluetooth Wireless Technology Standard, or other short wireless standards may utilized in the present invention.

Figure 2:
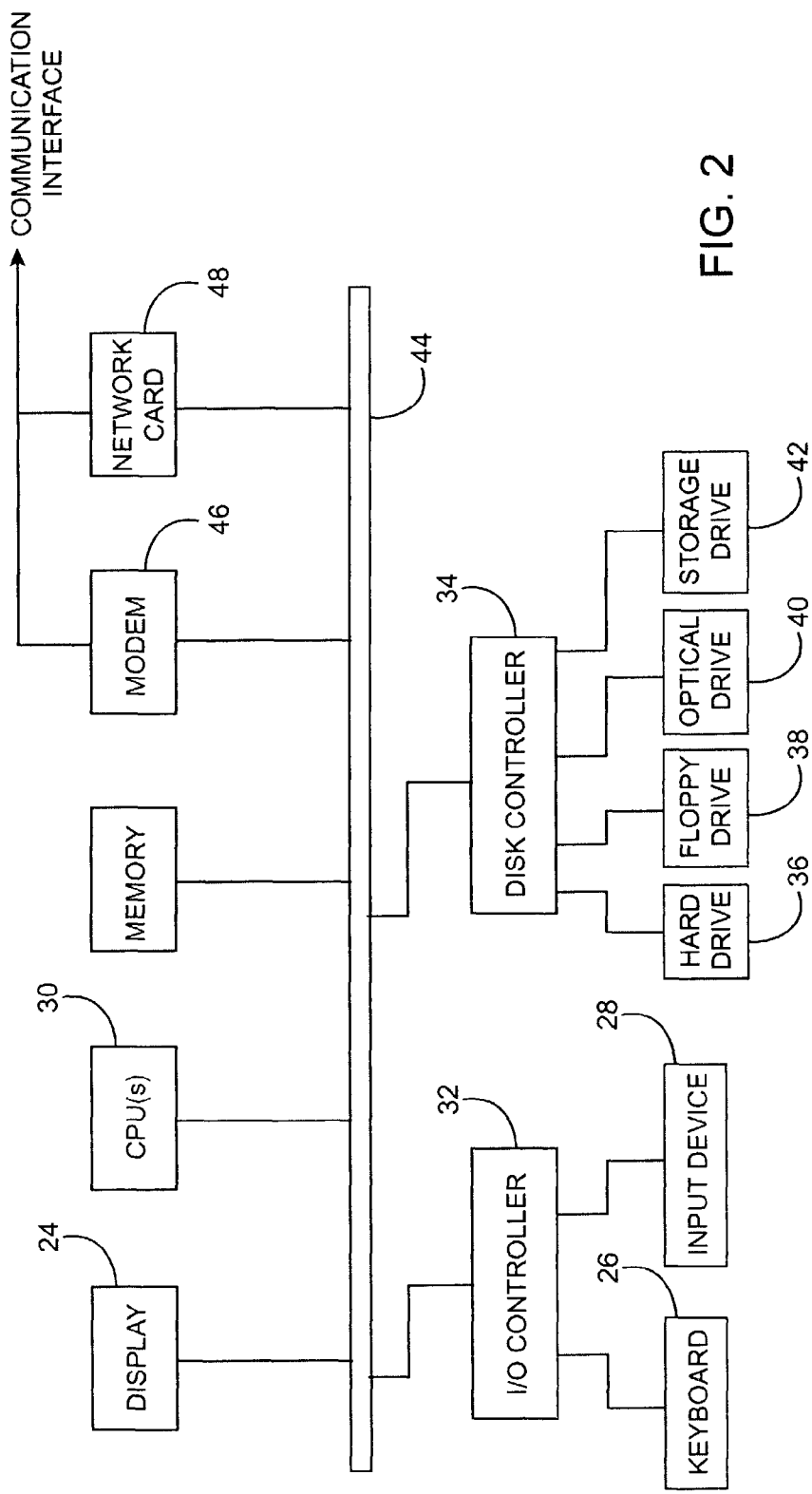
FIG. 2 is a block diagram illustrating an example of a computer system used to implement the present invention.

The computer system, as shown in FIG. 2, may include a display 24, a keyboard 26, input device 28, central processing unit(s) 30, I/O controller 32, disk controller 34, hard drive 36, floppy drive 38, optical drive 40, and a storage device 42. The storage device can be configured as memory or another processor readable medium. Each of the devices communicate over bus 44. The computer is not limited to these generally devices or software since the computer will include other computer devices and/or software based upon the system configuration.

In one example, the computer interfaces with the communication interface via a modem 46, a network card 48 or some other communication mechanism, such as cellular or satellite communications.

Figure 3:
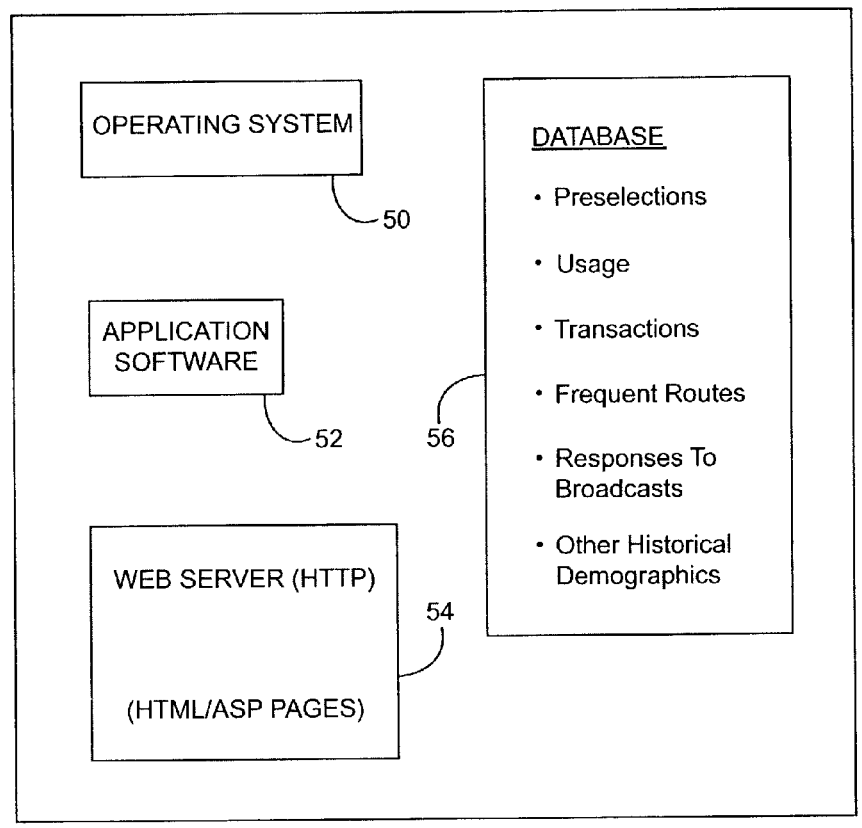
FIG. 3 is a block diagram illustrating an example of a system configuration used to implement the present invention.

FIG. 3 is an example of the system configuration of the server system used to implement the present invention. The server system includes an operating system 50, application software 52, a web server (http server) 54, and a database system 56. The database system 56 may include several databases or files, including preselections, usage, transactions, frequent or frequented routes, responses to broadcasts, or requests for information, or other historical demographics.

Figure 4:
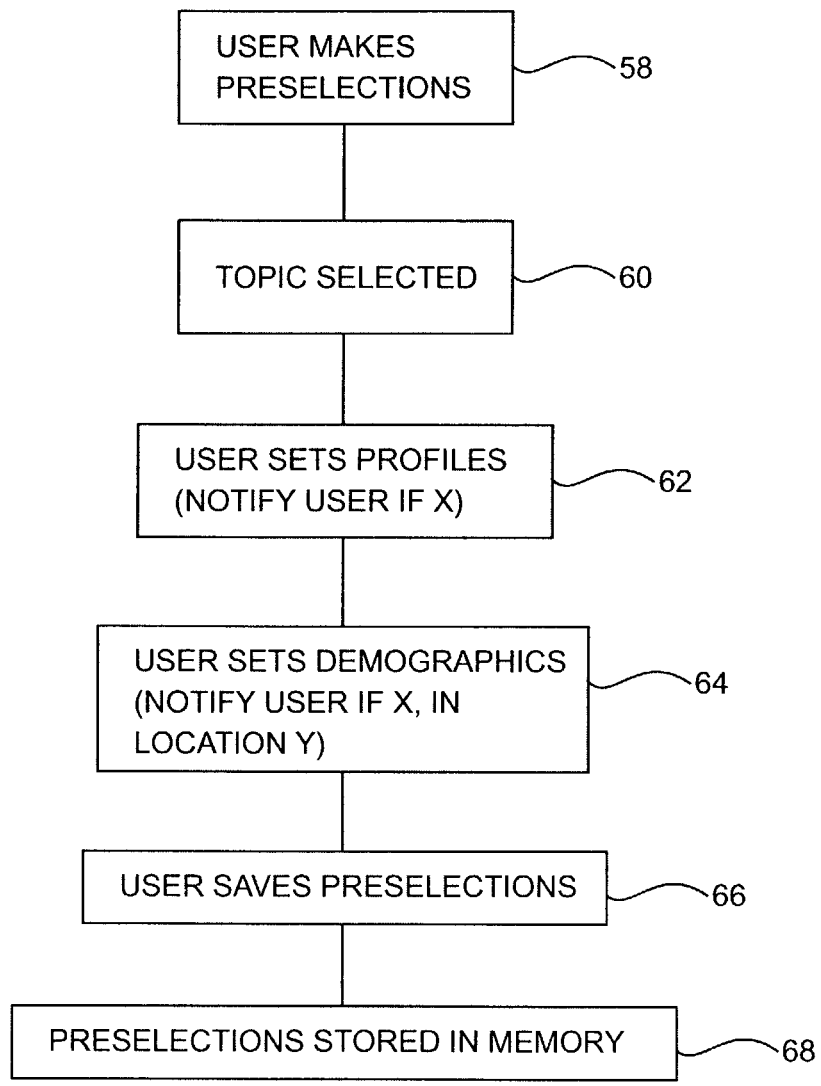
FIG. 4 is a flow chart illustrating a communication device user preselection process according to the present invention.

As shown in FIG. 4, the user of the communication device makes preselections 58 from a menu. These preselections initially establish a baseline demographic for this particular user of the communication device. At step 60 the user selects a topic to make the preselections, such as food, entertainment, shopping, social, or other interested categories available on the menu. The user may utilize a menu on the communication device itself or the selection process may be Web based. At step 62, the user sets particular profiles of interest in the selected category, such as notify the user by broadcasting to the communication device if a certain event happens. The event may be that the user is in the proximity of a store, restaurant, person, event, or other item selected by the user. At step 64, the user may set certain demographics, such as notify the user if the user is in the proximity of a store, such as within five miles, or within a certain zip code, or city, or some other geographical limitation. At step 66 the user saves the preselections. At step 68 the preselections are stored in memory either in the communication device, or preferably, in the computer system of the telecommunication network.

Figure 5:
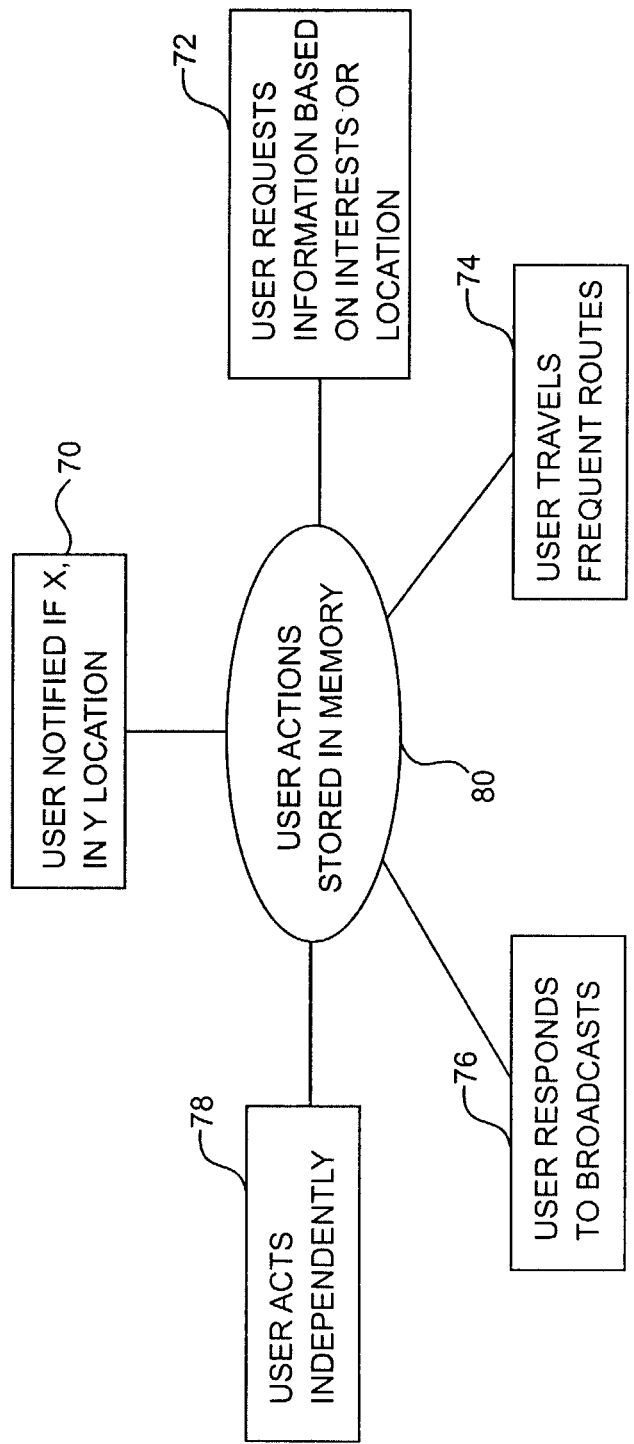
FIG. 5 is a flow chart illustrating the a communication device user usage pattern as tracked according to the present invention.

FIG. 5 illustrates how the user's actions, or inactions are stored in memory to compile, maintain, and update the historical demographics and database relating to the user. At step 70, the user is notified based on preselections made. The user's actions or inactions are stored at step 80 based upon the notification of the preselected event. Other actions or inactions include step 72, where the user requests information based on interests not preselected or based on the user's location. At step 74 the user travels frequent or frequented routes and these actions are stored into memory. At step 76, the user responds to broadcasts from the telecommunication system and the user's actions are stored into memory. At step 78, the user acts independently, such as making a visiting or making a purchase at a store. Purchases by the user are stored when the user utilizes the communication device to make the purchase. Bluetooth technology or other short distance wireless communication standards allow the communication device to make purchases.

In one embodiment of the present invention, a user of a device logs onto the computer system via the device, a land based telephone, a computer, or other communication means via the Internet, land based telephone lines, or other communication devices. The term device and handset are also used interchangeably herein. The user identifies himself or herself by the logging on process and then communicates with the computer system by inputting certain information into computer screens. It will appreciated that parents will have certain controls available to them to either preselect what their children will have access to at a subsequent log on or will be able to prevent their children to have access to certain material. After the user logs on to the system, the user will be able to determine what communications he or she will receive. For example, the user may select to receive advertisements from certain stores and/restaurants, or select from other categories of interest such as concerts, grocery stores, department stores, specialty stores, libraries, parks, etcetera, so that when the handset is within a certain distance or range from the area of interest, an advertisement or message from the area of interest will be broadcast on the handset, either by voice, ring, or message on the handset screen.

The user also may select that he wishes to receive a message when he is in a certain distance of another person or persons who have the same selected interest. For example, a male looking for a female, who is looking for a male. These examples are not exhaustive of the potential lists of matches that could be preselected on the computer system and then executed when the users are in different environments. Of course, for the communication to be executed by the computer system, all participants must have preselected to receive such communications. For example, in the case people looking for other people, both must have preselected that they were willing to communicate with people of their respective categories. In another embodiment, certain users may not preselect whom they will receive communications from. For example, for users who desire to have a free wireless service, the trade off may be that they cannot screen or preselect who they will receive communications or broadcasts from.

After the user preselects the areas of interest, the user then establishes a pattern of usage by receiving messages, responding to the messages by either ignoring them or acting upon them, and such usage, responses and lack thereof are recorded by the computer system in the database for each particular user. The device uploads data to the computer system by a variety of methods. For example, the GPS system monitors the whereabouts of the user and determines if the user has responded to an advertisement by going to one of the places that was preselected and an advertisement was sent. In the alternative, the advertisement may send a teaser advertisement to the user wherein the user must respond to obtain the full advertisement, such as a percentage off, or to obtain the address of the advertiser and may poll the user whether the user actually went to the advertiser's location. Another alternative is for the advertisers to have short wave communication systems in place, such as a BLUETOOTH enabled system, so that when the user enters the advertiser's place of a business, the device communicates with the BLUETOOTH enabled system and the database is then updated of the user's actions. It will be recognized that utilizing this technology, a user does not have to preselect a certain establishment, but may be included in a demographic group by just visiting an establishment. This method allows the demographic group to include registered as well as nonregistered users. Also, purchases made with a handset or via a handset may be tracked.

After the database is updated regarding the users responses to certain advertisements, a demographic profile of the user or a particular handset is developed in the computer system 20 utilizing the data in database. Of course, such a demographic profile is very valuable and could be sold to various merchants or advertisers who the user would be a likely customer of. Also, based on the user's or handset's profile, the advertisements may be altered to provide a higher success rate of execution or follow through on the advertisement. For example, if a user has positively responded to certain advertisements in the past to an establishment, subsequent advertisements may include further discounts, such as a frequent user discount that is displayed on the user's screen or a frequent user discount that is left in the user's voicemail box with a code that may be used for redemption. The advertisements or redemptions may be proportionate to the need of a user's inventory or business cycle.

For example, if a particular restrauant is slow on Wednesdays, advertisements may be broadcast to a select group of users or handsets based on the demographic profiles for special pricing on Wednesdays. Another advantage of the present invention is that custom advertisements for certain groups of users that have been compiled may be quickly broadcast based on business conditions. For example, using the restraunant case study again, if a restraunant is having a slow night that might not typically be a slow night, a broadcast could be sent to a certain group of frequent users/diners. Another example could include if the restraunant has an oversupply of food that needs to be sold versus being discarded. The system disclosed may also be utilized by broadcasting specials and asking for a response to make reservations or to make a purchase. It will be appreciated that the restraunant example is exemplary only and is not intended to be a limitation; the disclosed method and system can be utilized in endless situations. It will also be appreciated that the customized broadcasts may be either proportional or reversely proportional based on the user's history. For example, an establishment may reward frequent usage by providing more frequent or greater discounts for frequent purchasers. In the alternative, more frequent or greater discounts may be provided to first timers to get them into the establishments with the discounts becoming less frequent or for lesser amounts once more frequent usage is established. Of course the broadcast discounts may be increased if usage is determined to be diminished. An advantage of the present invention is that each user may be tracked and broadcasts sent to the user's handset based on the user's responses to past broadcasts and subsequent behavior.

The disclosed first embodiment includes any analysis or manipulation of the user's history to customize certain broadcasts to the user or handset. It will be appreciated by those skilled in the art that the user's history may be analyzed in several ways. To list just a few, the user's history may be analyzed based on geographic history, chronological history, user family history in the case of multiple users for a handset, seasonal history, usage patterns either in serial or parallel, etcetera.

Figure 6:
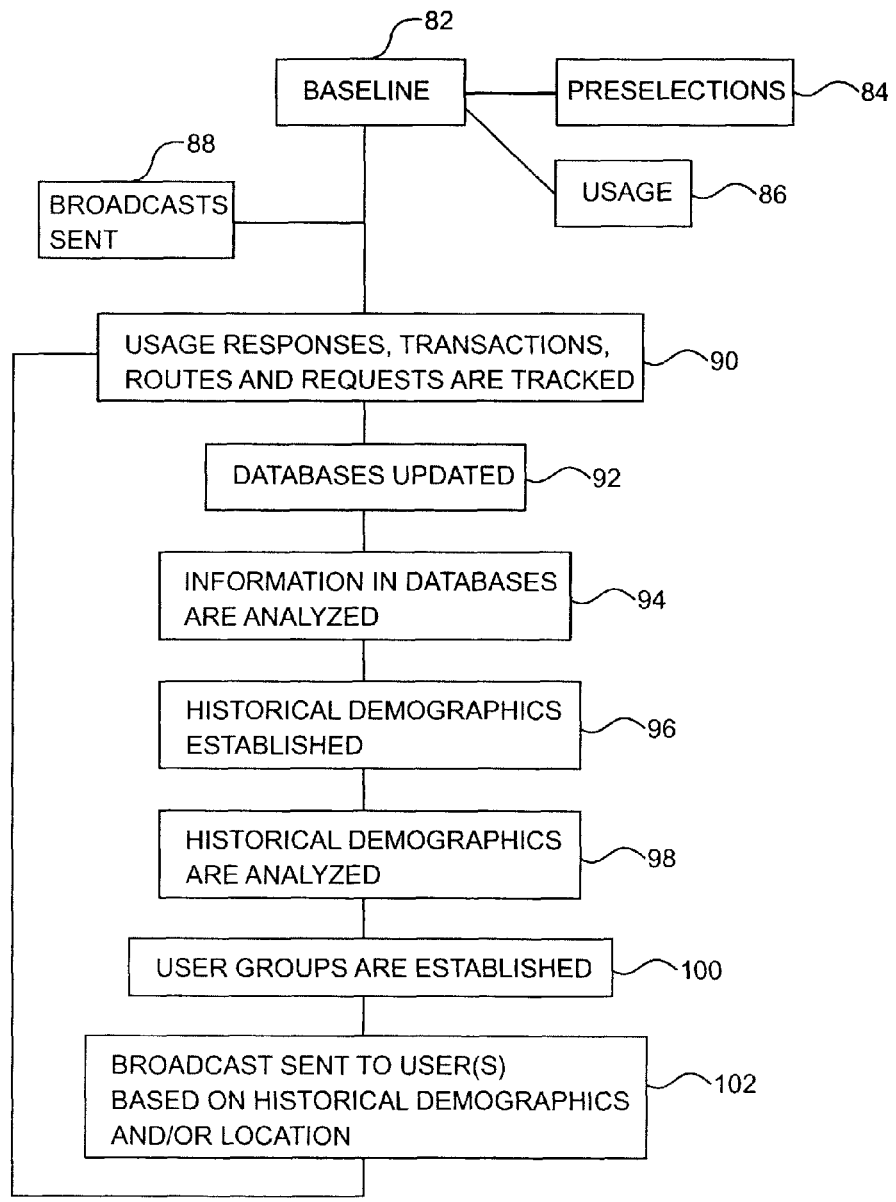
FIG. 6 is a flow chart illustrating the tracking and usage analysis of the communication device as well as the resulting targeted broadcasting to the communication device according to the present invention.

FIG. 6 illustrate a flow chart according to the present invention. At step 82 a baseline is established for a user or handset based on preselections 84 made by the user making selections regarding broadcasts that he is interested in receiving or by starting with usage 86, if any, of the handset which is tracked. In step 88 broadcasts are sent to the handset based on selections made or based on a set of defaults or based on usage at step, if any. The usage of handset is subsequently tracked in step 90, usage meaning locations of the handset, purchases made with the handset, and communications made with the handset, as well as other methods to track usage. The database is updated in step 92 based on the usage of the handset. In step 94 information in the databases are analyzed or filtered. In step 96 a historical demographic is established based on the usage of the handset. In step 98 the demographic is analyzed to recognize patterns in said usage, whether the patterns are in responses to broadcasts sent to the handset or not. In step 100 user groups are established based on the demographics analyzed. This allows broadcasts to be sent to specific user groups. In step 102 broadcasts are sent to users based on the demographics established and analyzed. The process then continues by looping back to step 90 with the usage being tracked. This method establishing a very accurate demographic profile as a function of time and the tracking of usage.

This method allows the demographic profile to be modified as the user's tastes and preferences change.

Other features of the present invention include the demographic profile being stored on a computer so that as the user changes handsets do to upgrades, breakage, or loss, the profile may be easily switched to another handset by simply logging onto to the computer system or by the handset or network's customer service personnel.

Another example is the present invention could be used to create a dynamic marketplace for placing orders for advertisements, that are based on availability. For example, if an establishment has an oversupply, broadcasts could be placed to a user or a user group and a purchase could be made with the device and an account could be charged. Therefore, based on availability, prices for advertisements and goods would fluctuate in real time. Goods could also be auctioned. Also, frequent advertisers and purchasers could be rewarded with discounts.

While the invention is being described in detail with reference to the preferred embodiments thereof, it will be apparent to one skilled in the art that various changes and modifications can be made and equivalents employed, without departing from the present invention.

I claim:

1. A wireless communication system for use with a wireless communication device and a position location system providing position location data indicating positions of the wireless communication device as the wireless communication device moves, said wireless communication system comprising:

a memory;

a processor operatively coupled to the memory and configured to receive the position location data, the processor being configured to process the position location data to determine whether the wireless communication device is in proximity to a certain location and to determine whether an advertisement should be sent to the wireless communication device when the wireless communication device is in proximity to the certain location in accordance with a plurality of historical demographics associated with the user of the wireless communication device, the processor being configured to track and to store user action and user inaction based on the advertisement transmitted to the wireless communications device, the processor being configured to update a plurality of historical demographics based on the user action and the user inaction, the processor being configured to track patterns of usage that are independent of the transmitted advertisements and to update a particular user demographic stored in the database based on the tracking patterns of usage that are independent of the transmitted advertisements, the processor being configured to add the user to an existing user demographic based on the tracked patterns of usage of the user, wherein the user is a registered user, and wherein unregistered users are part of the existing user demographic; and a transceiver operatively coupled to the processor, the transceiver being configured to transmit the advertisement to the wireless communication device if the wireless communication device is in proximity to the certain location and if the plurality of historical demographics indicate that user is interested in receiving the advertisement when the wireless communication device is in proximity to the certain location, the transceiver being configured to receive a response to the advertisement from the wireless communication device, the transceiver being configured, based on the received response, to transmit a version of the advertisement to the wireless communication device that includes a discount, wherein the advertisement to which the wireless communication device responded is a teaser advertisement, wherein the version of the advertisement that includes the discount is a full version of the advertisement, and wherein the wireless communication device includes a handheld cellular device.

2. The wireless communication system according to claim 1, wherein the position location system includes the Global Positioning Satellite (GPS) system.

3. The wireless communication system according to claim 1, wherein the handheld cellular device includes a cellular phone.

4. The wireless communication system according to claim 1, wherein the transceiver transmits the advertisement to the wireless communication device only if the advertisement is of interest to the user based at least on historical demographics of a first kind and historical demographics of a second kind that are tracked by the processor.

5. The wireless communication system according to claim 4, wherein the historical demographics of the first kind include a history of purchases made by the user of the wireless communication device, and wherein the historical demographics of the second kind include a history of positions of the wireless communication device.

6. The wireless communication system according to claim 1, wherein the processor is configured to update one or more of the historical demographics associated with the user based on one or more of frequented routes, frequented restaurants, and frequented stores.

7. A wireless communication system for use with a wireless communication device and a position location system providing position location data indicating positions of the wireless communication device as the wireless communication device moves, said wireless communication system comprising:

a memory, a processor operatively coupled to the memory and configured to receive the position location data, the processor being configured to process the position location data to determine whether the wireless communication device is in proximity to a certain location and to determine whether a database of user demographics indicates that the user of the wireless communication device has an interest in receiving an advertisement when the wireless communication device is in proximity to the certain location, the processor being configured to track patterns of usage based on the advertisement transmitted to the wireless communications device, the patterns of usage including one or more of response to the advertisement, non-response to the advertisement, request of additional information, travel to particular destinations based on the advertisement, and travel over particular routes based on the advertisement, the processor being configured to store the patterns of usage that are independent of the transmitted advertisements and to update a particular user demographic stored in the database based on the tracking patterns of usage that are independent of the transmitted advertisements, the processor being configured to add the user to an existing user demographic based on the tracked patterns of usage of the user, wherein the user is a registered user, and wherein unregistered users are part of the existing user demographic; and a transceiver operatively coupled to the processor, the transceiver being configured to transmit the advertisement to the wireless communication device if the wireless communication device is in proximity to the certain location and if the database of user demographics indicates that the user of the wireless communication device has an interest in receiving the advertisement when the wireless communication device is in proximity to the certain location, the transceiver being configured to receive a response to the advertisement from the wireless communication device, the transceiver being configured, based on the received response, to transmit a version of the advertisement to the wireless communication device that includes a discount based on user demographics of the user, wherein the advertisement to which the wireless communication device responds is a teaser advertisement, wherein the version of the advertisement that includes the discount is a full version of the advertisement, and wherein the wireless communication device includes a handheld cellular device.

8. The wireless communication system according to claim 7, wherein the position location system includes the Global Positioning Satellite (GPS) system.

9. The wireless communication system according to claim 7, wherein the handheld cellular device includes a cellular phone.

10. The wireless communication system according to claim 7, wherein the transceiver transmits the advertisement to the wireless communication device only if the advertisement is of interest to the user based at least on historical demographics of a first kind and historical demographics of a second kind that are tracked by the processor.

11. The wireless communication system as claimed in claim 10, wherein the historical demographics of the first kind include a history of purchases made by the user of the wireless communication device, and wherein the historical demographics of the second kind include a history of positions of the wireless communication device.

12. The wireless communication system according to claim 7, wherein the patterns of usage includes responses to the advertisement, non-responses to the advertisement, requests of additional information, travel to particular destinations based on the advertisement, and travel over particular routes based on the advertisement.

13. The wireless communication system according to claim 7, wherein the processor is configured to update one or more of the historical demographics associated with the user based on purchases made by the user.

14. A method of operating a wireless communication system for use with a wireless communication device and a position location system to provide position location data indicating positions of the wireless communication device as the wireless communication device moves, wherein the wireless communication device includes a handheld cellular device, said method comprising:

storing in a memory a database of user demographics;
receiving the position location data from the position location system;
processing the position location data to determine when the position location data indicates that the wireless communication device is in proximity to the certain location;
processing the database of user demographics for an indication that the user of the wireless communication device has an interest in receiving an advertisement when the wireless communication device is in proximity to the certain location;
transmitting the advertisement to the wireless communication device if the wireless communication device is in proximity to the certain location and if the database of user demographics indicates that the user of the wireless communication device has an interest in receiving the advertisement when the wireless communication device is in proximity to the certain location;
adding the user to an existing user demographic based on the tracked patterns of usage of the user, wherein the user is a registered user, and wherein unregistered users are part of the existing user demographic;
tracking patterns of usage based upon the advertisement transmitted to the wireless communications device, the tracked patterns of usage including an applicable one or more of response to the advertisement, non-response to the advertisement, request of additional information relating to the advertisement, travel to particular destinations based on the advertisement, and travel over particular routes based on the advertisement, wherein the advertisement to which the wireless communication device responds is a teaser advertisement, and wherein a full version of the advertisement that includes a discount can be sent after the wireless communication device responds;
updating a particular user demographic stored in the database to include the user based on the tracked patterns of usage of the user;
tracking patterns of usage that are independent of the transmitted advertisements; and
updating a particular user demographic stored in the database based on the tracking patterns of usage that are independent of the transmitted advertisements.

15. The method according to claim 14, wherein receiving comprises receiving the position location data from a Global Positioning Satellite (GPS) system.

16. The method according to claim 14, wherein transmitting the advertisement to the wireless communication device comprises transmitting the advertisement to the handheld cellular device.

17. The method according to claim 14, comprising: receiving a response to the transmitted advertisement from the wireless communication device; and transmitting, in response to the received response, a version of the previously transmitted advertisement including a discount.

18. The method according to claim 17, comprising: receiving a response to the transmitted advertisement from the wireless communication device; and transmitting, in response to the received response, a version of the previously transmitted advertisement including a discount based on the tracked patterns of usage of the user.

19. The method according to claim 18, comprising:
tracking purchases made by the wireless communication device.

* * * * *

UNITED STATES PATENT AND TRADEMARK OFFICE
CERTIFICATE OF CORRECTION

| | | |
|---|---|---|
| PATENT NO. | : 9,107,030 B2 | Page 1 of 1 |
| APPLICATION NO. | : 10/020094 | |
| DATED | : August 11, 2015 | |
| INVENTOR(S) | : Thomas E. Coverstone | |

It is certified that error appears in the above-identified patent and that said Letters Patent is hereby corrected as shown below:

ON THE TITLE PAGE

(76) Inventor should read: Thomas E. Coverstone, Hallsville, TX (US)

Signed and Sealed this
Fifteenth Day of March, 2016

Michelle K. Lee
*Director of the United States Patent and Trademark Office*